Figure 1:
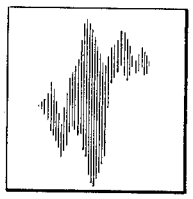

July 24, 1962 P. A. MARSAL 3,046,326
EXTENDED AREA ANODES
Filed July 10, 1958

INVENTOR
PAUL A. MARSAL (DECEASED)
BY JEANNETTE Y. MARSAL
EXECUTRIX

BY John F. Hohmann
ATTORNEY

United States Patent Office 3,046,326
Patented July 24, 1962

3,046,326
EXTENDED AREA ANODES
Paul A. Marsal, deceased, late of Rocky River, Ohio, by Jeannette Y. Marsal, executrix, Rocky River, Ohio, assignor to Union Carbide Corporation, a corporation of New York
Filed July 10, 1958, Ser. No. 747,769
2 Claims. (Cl. 136—120)

This invention relates to anodes for galvanic cells, and more particularly to anodes for use in conjunction with alkaline electrolyte.

It is known in the art that galvanic cells containing an alkaline electrolyte require a greatly extended anode surface area to operate satisfactorily. A solid strip or sheet zinc anode of the type in a Le Clanche type cell does not perform well in an alkaline environment. Under certain discharge conditions the surface passivates. This is usually evident by the formation of a dark-colored adherent dielectric layer over the surface of the zinc. When such a layer forms, the cell will no longer have useful output.

One type of anode which operates satisfactorily in an alkaline cell is composed of zinc powder suspended in a gel such as might be formed from sodium carboxymethyl cellulose. However, this type of anode has certain shortcomings. For example, in the powder gel suspension some of the metal particles are isolated in the gel, and hence do not make good electrical contact with their neighbors. Another disadvantage of the powder gel type anode is the difficulty in fabricating this into the thin layers needed in small flat type cells. In addition, poor service in cylindrical cells may result from high temperature thinning of the gel, which thereby allows the zinc to settle out from the desired geometrical location and pack into a solid mass. Charge-discharge cycling also tends to break down the gel.

It is, therefore, the main object of this invention to provide an extended area anode for galvanic cells, which avoids the difficulties inherent in the powder gel suspension type of anode. A further object of the invention is to provide a extended area anode of very low electrical resistance. Still another object of the invention is to provide an extended area anodic strip or sheet material which may be stored indefinitely in a dry condition, and which may later be cut and formed in various configurations to meet the need of various sizes and shapes of galvanic cells. A further object is the fabrication of porous anodic material which can be assembled in galvanic cells in laminar form. Another object is the fabrication of an extended area anode which will operate in an alkaline-type cell without passivation, and which occupies substantially less volume than the powder gel suspension. An equally important object is the fabrication of a sheet or strip form of anodic material in which a gel-forming ingredient is an integral part.

Figure 2:
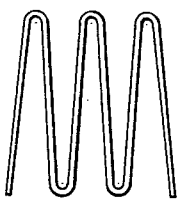
Figure 3:
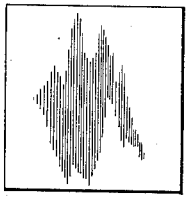
Figure 4:
Figure 5:
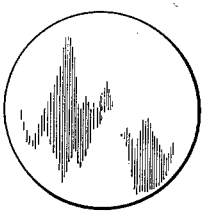
Figure 6:
Figure 7:
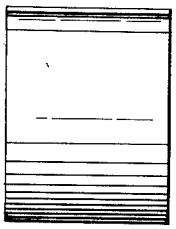
Figure 8:
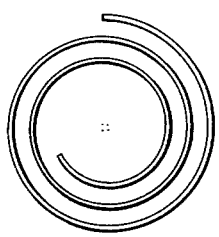
Figure 9:

These and other related objects, features and advantages of the present invention will be more fully understood as the description thereof proceeds, especially when taken together with the accompanying drawing in which:

FIG. 1 is a front elevational view of one anode according to the invention;
FIG. 2 is a side elevational view of the anode of FIG. 1;
FIG. 3 is a front elevational view of another embodiment of the invention;
FIG. 4 is a side elevational view of the anode of FIG. 3;
FIG. 5 is a front elevational view of still another form of the invention;
FIG. 6 is a side elevational view of the anode shown in FIG. 5;
FIG. 7 is a front elevational view of another embodiment of the invention;
FIG. 8 is a side elevational view of the anode shown in FIG. 7; and
FIG. 9 is a magnified cross-sectional fragmentary view of an anode in accord with the invention;

In the practice of the invention, fine porous anodic metal particles are sprayed onto a carrier matrix. Suitable carriers for use in making the anode of the invention are composed of textile fabrics. A preferred carrier medium is open mesh cloth such as pre-shrunk muslin or gauze.

When the fabric carrier is used, it is desirable to pre-shrink it by immersion in 9 N KOH solution for five minutes, subsequently washing with water, followed by drying and ironing. Various textiles shrink from 15 to 20 percent after such treatment. Gauze so treated at room temperature shrinks 21 percent in length and 16 percent in width. Open mesh cloth carriers preferably should be treated with an aqueous solution of an organic gel-forming agent such as starch and soluble cellulose derivatives such as the alkaline salts of carboxymethyl cellulose, methyl cellulose, hydroxyalkyl cellulose, hydroxyethyl cellulose and hydroxypropyl cellulose. A gel is thus formed when the later-formed anode is contacted by alkaline electrolyte. Of the enumerated gel-forming agents, starch, particularly as an impregnant for cheesecloth, and sodium carboxymethyl cellulose are preferred.

For particular applications, it is recommended that the non-conductive carrier be made conductive prior to the deposition thereon of the porous anodic layer. This can be achieved by coating the carrier with a chemically non-reactive (with respect to the cell system in which the anodes are to be used) electrically conductive material such as silver, tin and copper. Such coating can be effected by any conventional methods such as vaporization, sputtering or spraying.

The anode material is made by forcing fine anodic particles through a flame, the heat of which is capable of putting the particles in a molten state, but not in a free-flowing state. In this condition the particles can easily be sprayed onto a matrix, and will retain their particle configuration while adhering to one another. By the term anodic particles it is desired to cover various metals conventionally used in dry cells. Such metals include aluminum, magnesium, cadmium, nickel, silver, copper, tin and alloys thereof.

In a specific embodiment of the invention, a zinc anode was produced by spraying powdered zinc onto a pre-shrunk, bleached gauze 36 inches wide. The zinc particles were of a size such as to pass through a 100 mesh (Tyler) screen. The particles were sprayed by means of a Schori "model L" pistol using propane and oxygen to support the flame, and compressed air to siphon the zinc powder into the flame. The operating conditions for the pistol were:

Pounds pressure
Oxygen _____ 20
Propane _____ 10
Air _____ 10

The above listed are initial adjustments, and after the pistol was put in operation the oxygen was adjusted for approximately ¼ inch of bright blue flame. The pistol was held about 20 inches from the gauze during the spraying operation. The gauze was thus coated with a maximum coating thickness of 0.020 inch, representing 0.73 gram per square inch. The sprayed gauge was then coated with an amalgamating paint containing 1.30 percent of sodium carboxymethyl cellulose, 26.13 percent mercuric oxide and 72.57 percent of water, using about 0.312 gram of paint per gram of sprayed zinc. After the painted surface had dried, a coating of clear carboxymethyl cellulose gel was applied on the coated surface. The coated sprayed gauze was cut into strips sufficient to provide the required weight of zinc. To show the improved performance obtained with the anode of the invention, D-size cells were made with a gel suspension of zinc powder, and with a convolutely-wound sprayed anode made as above discussed. The cell using a gel suspension of zinc powder gave 20 amperes short circuit current. The similar cell using the anode of the invention gave 55 amperes.

What is claimed is:

1. An anode having a carrier matrix consisting of pre-shrunk, open mesh cloth having thereon a thin coating of a gel-forming agent selected from the group consisting of starch and the alkaline salts of carboxymethyl cellulose methyl cellulose, hydroxyethyl cellulose, and hydroxypropyl cellulose, said agent forming a gel when said anode is contacted by alkaline electrolyte, said matrix having a porous layer of anodic particles, said particles being in contact with one another.

2. An anode according to claim 1 wherein said carrier matrix has a conductive pre-coating of electrically conductive material, chemically non-reactive with respect to the cell system wherein said anode is to be used, said material being selected from the group consisting of silver, tin and copper.

References Cited in the file of this patent

UNITED STATES PATENTS

| | | |
|---|---|---|
| 2,317,759 | Haebler | Apr. 27, 1943 |
| 2,422,046 | Ruben | June 10, 1947 |
| 2,501,673 | Glassner | Mar. 28, 1950 |
| 2,678,342 | Porter | May 11, 1954 |
| 2,708,683 | Eisen | May 17, 1955 |

FOREIGN PATENTS

| | | |
|---|---|---|
| 271,496 | Great Britain | Sept. 29, 1927 |

UNITED STATES PATENT OFFICE
CERTIFICATE OF CORRECTION

Patent No. 3,046,326

July 24, 1962

Paul A. Marsal, deceased, by Jeannette Y. Marsal, executrix

It is hereby certified that error appears in the above numbered patent requiring correction and that the said Letters Patent should read as corrected below.

Column 1, line 33, for "cyindrical" read -- cylindrical --; line 42, for "a" read -- an --; column 2, line 68, for "gauge" read -- gauze --; column 3, lines 16 and 17, after "cellulose" insert a comma.

Signed and sealed this 20th day of November 1962.

(SEAL)
Attest:

ERNEST W. SWIDER
Attesting Officer

DAVID L. LADD
Commissioner of Patents